United States Patent [19]

Viertel et al.

[11] 4,174,864
[45] Nov. 20, 1979

[54] LIGHTED SUN VISOR FOR VEHICLES

[75] Inventors: Lothar Viertel, Wuppertal; Manfred Nowak, Solingen, both of Fed. Rep. of Germany

[73] Assignee: Gebr. Happich GmbH, Wuppertal, Fed. Rep. of Germany

[21] Appl. No.: 866,992

[22] Filed: Jan. 5, 1978

[30] Foreign Application Priority Data

Jan. 28, 1977 [DE] Fed. Rep. of Germany ....... 2703447

[51] Int. Cl.² ............................................. B60J 3/02
[52] U.S. Cl. ................................. 296/97 H; 362/144
[58] Field of Search ............... 296/97 R, 97 B, 97 H; 362/61, 74, 802, 135, 142, 144

[56] References Cited

U.S. PATENT DOCUMENTS

| | | | |
|---|---|---|---|
| 1,717,467 | 6/1929 | Schleich | 339/252 S |
| 2,123,319 | 7/1938 | Thompson | 296/97 R |
| 3,211,903 | 10/1965 | McElreath | 362/802 |
| 3,399,923 | 9/1968 | Bornefeld | 296/97 R |
| 4,075,468 | 2/1978 | Marcus | 362/144 |

Primary Examiner—Joseph F. Peters, Jr.
Assistant Examiner—John A. Carroll
Attorney, Agent, or Firm—Ostrolenk, Faber, Gerb & Soffen

[57] ABSTRACT

A vehicle sun visor is supportable on a vehicle body by a main bearing and by a counterbearing; the vehicle electrical system is connected to contacts in the counterbearing housing; leads to a lamp on the sun visor are connected to contact means on the visor body and the contact means on the visor body are engageable with the contact means in the counterbearing housing; a cover over the lamp includes contacts which are opened and closed by movement of the cover.

18 Claims, 8 Drawing Figures

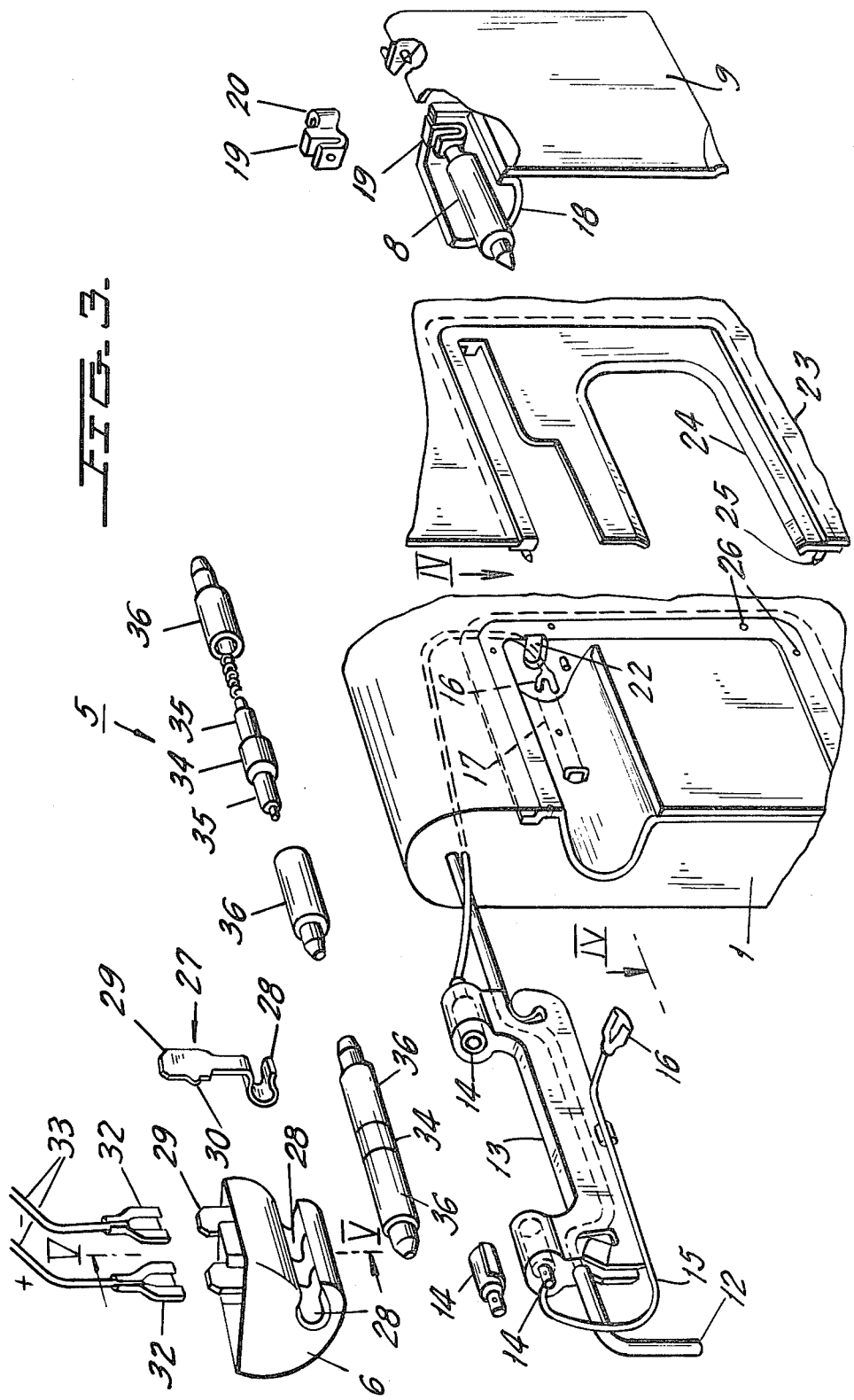

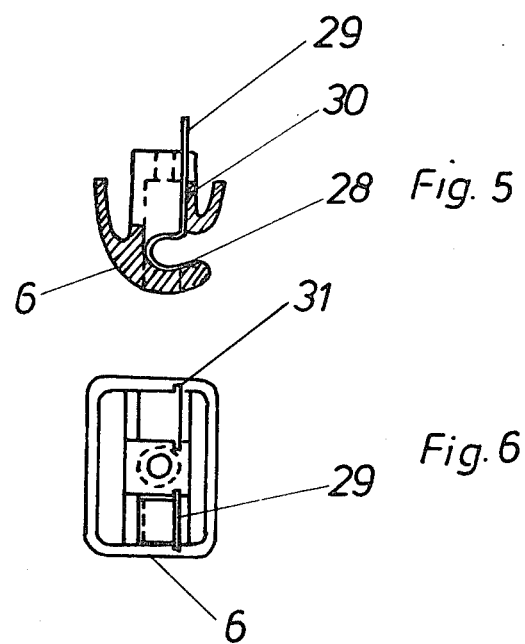
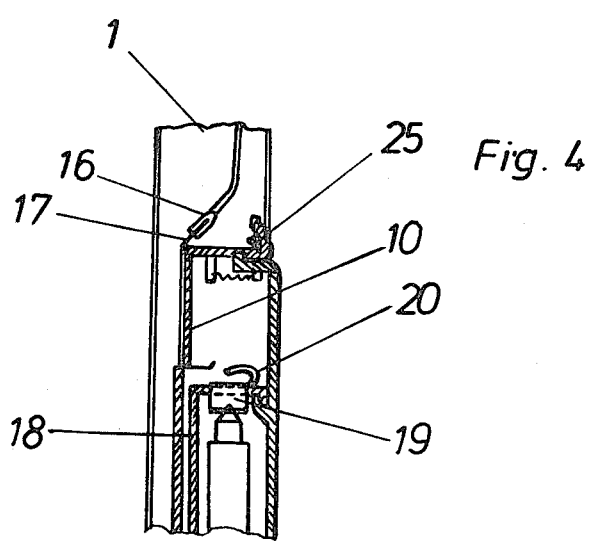

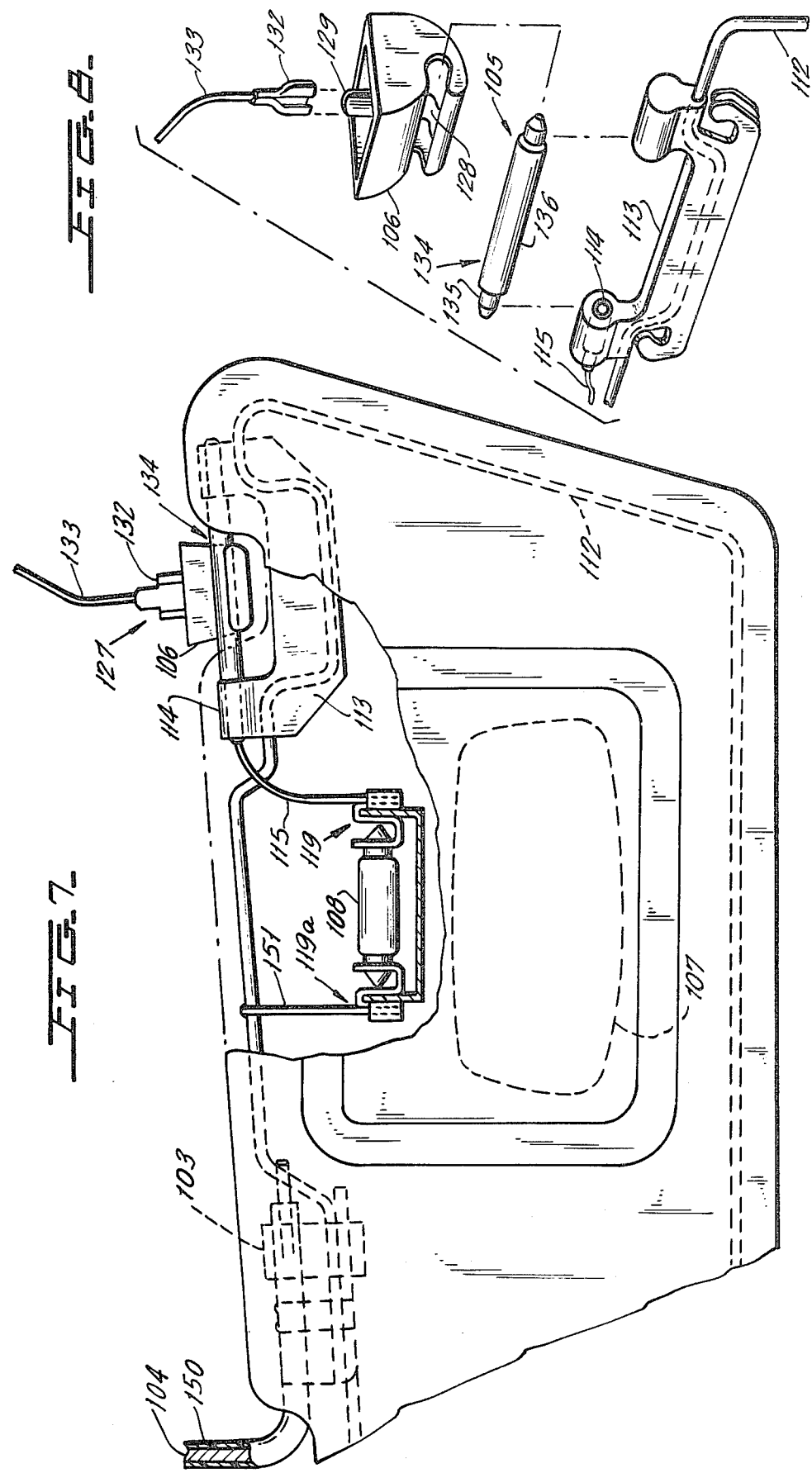

LIGHTED SUN VISOR FOR VEHICLES

The invention relates to a sun visor for a motor vehicle. The visor includes a light and, more particularly, it includes an illuminated mirror.

BACKGROUND OF THE INVENTION

A sun visor has a main supporting swivel bearing located at one end area of its upper longitudinal edge. This bearing is comprised of a housing and of a sun visor shaft. In some sun visors, there also is a counterbearing located at the other end area of the visor. With the sun visor in position over the vehicle windshield, it is supported at both ends by both the bearing and the counterbearing. The counterbearing comprises a counterbearing shaft which is detachably connected to a counterbearing housing on the body of the vehicle.

There may be a mirror attached to a surface of the sun visor body. The visor is also provided with a light source which would be associated with the mirror, if a mirror is provided. The light source may be connected through electric leads to the electrical system of the vehicle and to a ground wire.

Sun visors have been equipped with mirrors for a long time. Such mirror equipped sun visors are usually installed on the passenger side of motor vehicles. In order that the mirror might also be used in darkness, it is already known to place a light source on the visor near the mirror. Because sun visors are usually mounted in vehicles so that they can be flipped up and down around their main bearing and so that they can be swiveled to the side around their main bearing, wiring of the light source is difficult. The simplest way to support the wires would be to apply them on the outer skin of the sun visor body. But, this is undesirable for esthetic reasons and because the wires could easily be torn off when the visor is cleaned or during normal use of the visor.

In one known sun visor design, a hole is drilled through the sun visor main bearing shaft, and the electric wires are pulled through the hole to the light source. While this offers the advantage of hiding the electric wires within the sun visor shaft and the sun visor body, it requires extremely costly machining operations on the sun visor shaft and very high assembly costs.

SUMMARY OF THE INVENTION

It is the primary object of the invention to provide a sun visor with a light source.

It is further object of the invention to provide a sun visor with an illuminatable mirror.

It is another object of the invention to electrify the light source on the visor without incurring wiring costs.

It is a further object of the invention to electrify the light source using wiring which will not be damaged during use or cleaning of the visor.

Starting from a sun visor of the kind described above, according to the invention, the counterbearing housing of the visor is equipped with at least one contact element to which an electric conductor of the electric system of the vehicle can be connected. This contact element of the counterbearing housing is in contact with cooperating contact means on the counterbearing shaft, to which at least one current carrying conductor for the light source is connected. Because the current supply to the light source is via the counterbearing housing, the current supply is hidden, simple and permanent.

The counterbearing shaft preferably has a clip type contact connection with the contact element in the counterbearing housing so as to form a plug-in connection with that contact element. Current supply to the light source is assured without requiring wires to be led from the electrical system of the vehicle to the light source. The conductor leading from the counterbearing shaft to the light source can be formed as an integrated component of the visor during production of the sun visor. The current supply to the light source may be interrupted when the sun visor is swung to the side window because the counterbearing shaft on the visor body is thereby separated from the counterbearing housing on the vehicle body. But, there is no need to light the mirror when the sun visor has been swung sideward.

The ground connection to the light source can be established in simple manner via the sun visor main bearing shaft which is connectable to the vehicle body. A metal wire insert in the sun visor body, which may be the reinforcing insert of the sun visor, serves as the ground connection to this shaft. The sun visor main bearing shaft may then be comprised of metal, in a known manner. But, the main shaft may also be comprised of a metal core with plastic molded around it.

According to one embodiment of the invention, the counterbearing housing is equipped with two spaced apart contact elements which contact the counterbearing shaft at spaced apart locations. The counterbearing shaft comprises two contact elements and an insulator between them. This makes it possible to connect both of the positive and the ground leads at the counterbearing housing and to then connect these leads to the light source via conductors that are embedded in the sun visor body. In this embodiment, it is possible for the sun visor shaft to also be made of plastic.

The counterbearing housing may have at least one plug-in opening that is equipped with detent grooves for holding the contact element or elements to which the respective contact elements on the counterbearing shaft are connected. The lower part of each counterbearing housing contact element may be designed as a contact spring to receive the respective contact element on the counterbearing shaft. The upper part of each contact element of the counterbearing housing is designed as a contact pin, which projects beyond the counterbearing housing to provide a plug connection to a respective current lead. The upper part of each counterbearing housing contact element has a longitudinal edge that engages a detent groove in the plug-in opening in the counterbearing housing. This requires only a slight modification of the counterbearing housing from the conventional design, causing no significant cost increase. Also, the production of the contact elements and their assembly are simple and cheap.

To enable emplacement of the counterbearing shaft in a support on the visor body and to help establish electric contact, the counterbearing shaft telescopes to be received in its support. The shaft is comprised of a central plastic part with molded-on pins at both ends that carry metal sleeves. Each sleeve serves as a contact element of the counterbearing shaft. A helical spring is seated between the plastic part and one metal sleeve. This structure enables the counterbearing shaft to be in contact with the positive and negative poles in the counterbearing housing at the same time and to carry the current to the light source. Both ends of the counterbearing shaft may engage contact elements in the counterbearing housing. Such contact elements are designed in the form of round sockets, and these sockets are connected by leads to the light source.

A contact breaker, operable through a flip open cover covering the light source, is associated with the light source to connect the light source to the counterbearing shaft when the cover is open and to disconnect the light source when the cover is closed.

One advantage of the invention is that the sun visor has no loose electric wires which are difficult to connect to the positive and/or negative conductors of the electric system of the vehicle. It is merely necessary to connect conductors of the electric system of the vehicle to the contact element or elements, preferably through a plug connection, before fastening the counterbearing housing in place.

BRIEF DESCRIPTION OF THE DRAWINGS

Other objects and features of the invention are shown in the drawings, in which:

FIG. 3 is an exploded view showing details of the sun visor;

FIG. 4 is a cross-sectional view through the sun visor along line IV—IV of FIG. 3;

FIG. 5 is a cross-sectional view of the counterbearing housing along line V—V of FIG. 3;

FIG. 6 is a top view of the counterbearing housing shown in FIG. 5; and

FIG. 7 is an elevational view of a sun visor provided with a second embodiment of the invention;

FIG. 8 is an exploded view showing details of the counterbearing housing shown in FIG. 7.

DESCRIPTION OF THE PREFERRED EMBODIMENTS

Figure 1:
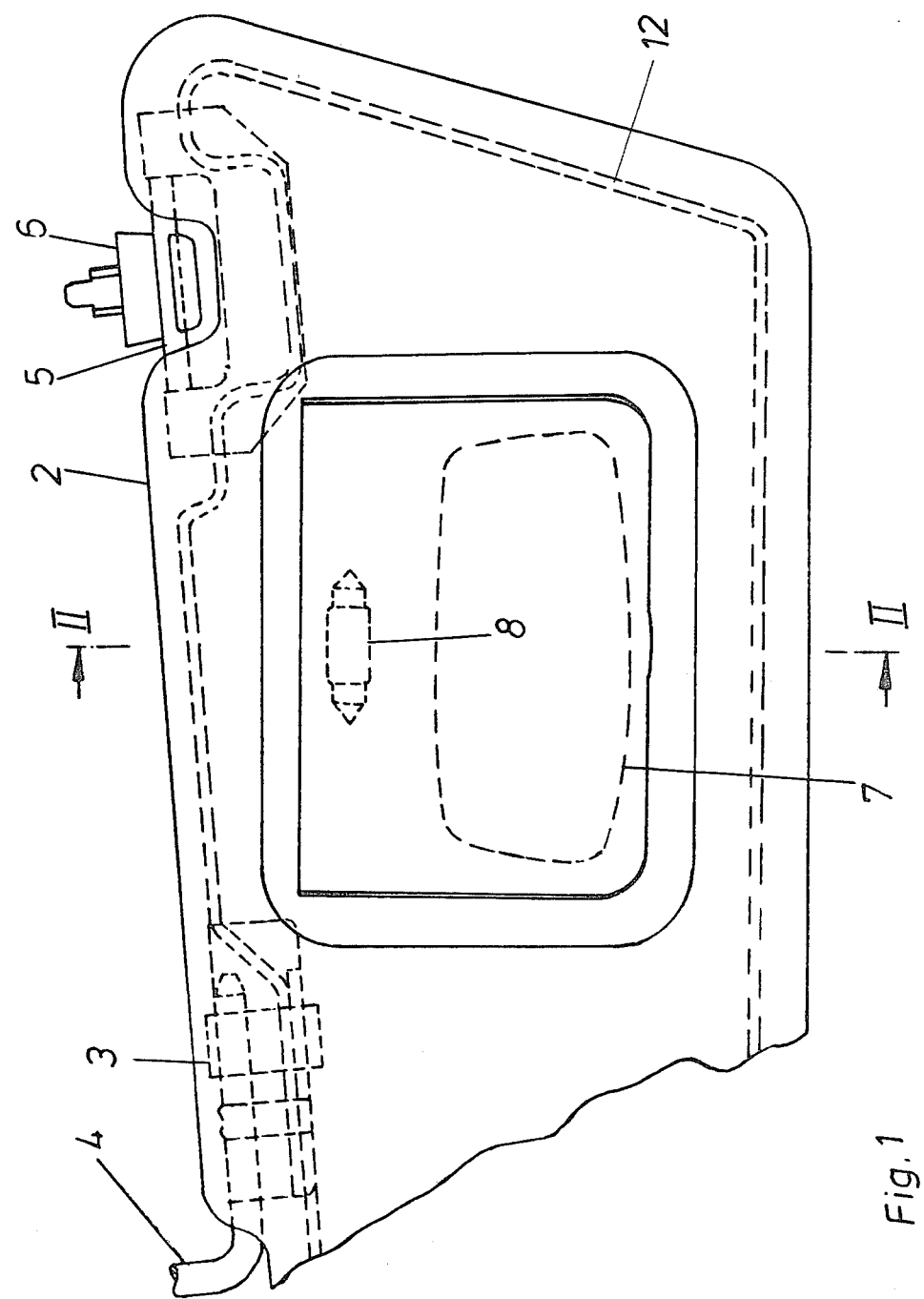
FIG. 1 is an elevational view of a sun visor provided with a first embodiment of the invention.

The sun visor of the invention is principally intended for use in motor vehicles. As shown in the first embodiment of FIG. 1, the visor comprises a sun visor body 1 conventionally formed of and filled with a foamed plastic material. At the upper longitudinal edge 2 of the body, at one end area, there is a conventional main swivel bearing, which is comprised of the bearing housing 3 on the visor body 1 and the sun visor shaft 4 which frictionally engages in the housing 3. The shaft 4 is attached to the body of the vehicle. The visor body 1 may be pivoted up and down around shaft 4, and the visor body may also be swivelled toward and away from the below described counterbearing housing 6 around the vertical leg of shaft 4.

There is a counterbearing comprised of a counterbearing shaft 5, which is attached to the visor body, and a counterbearing housing 6, which is attached on the vehicle body. The counterbearing is disposed in the other end area of the upper longitudinal edge 2 of body 1 from the main bearing 3, 4.

Figure 2:
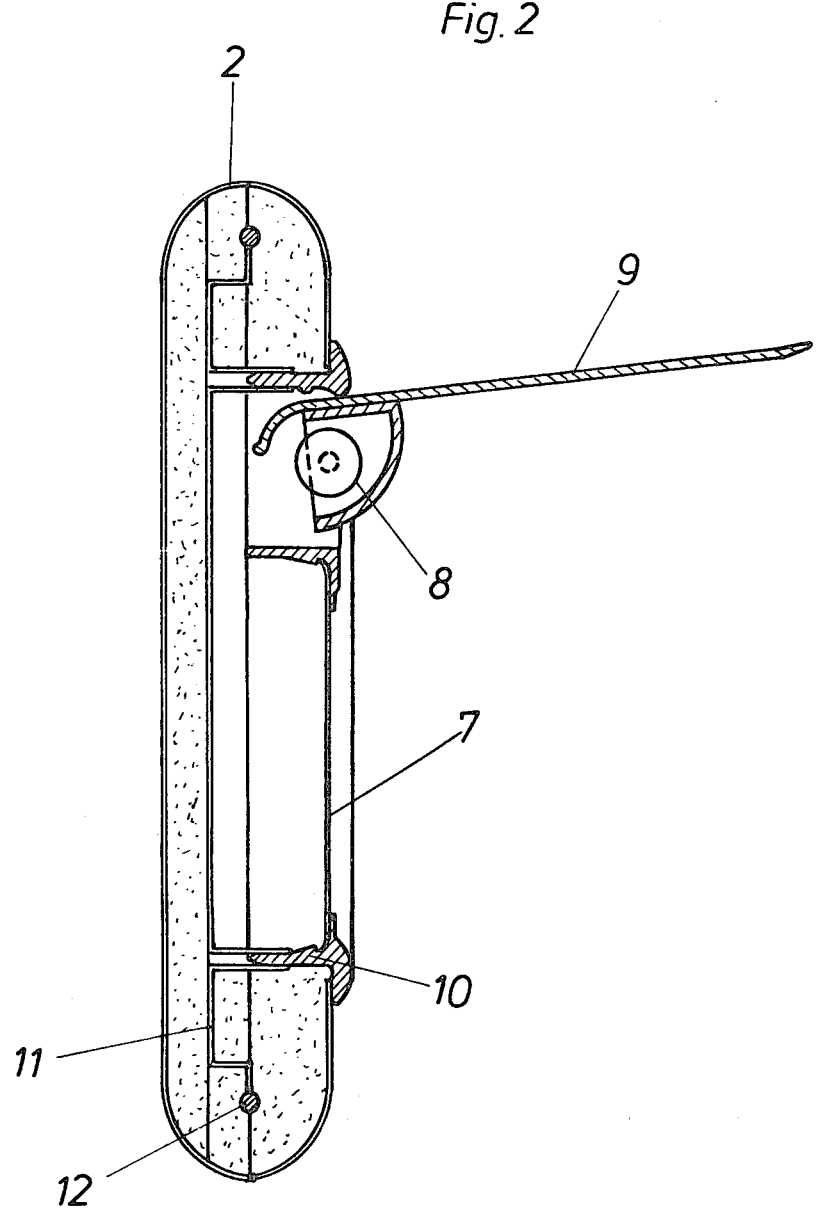
FIG. 2 is a cross-sectional view along line II—II of FIG. 1.

A mirror 7 with an associated lamp 8 is disposed on the side of the sun visor body 1 that faces the passenger compartment of the vehicle when the sun visor is flipped into its down position around shaft 4. The mirror 7 can be covered up and the lamp 8 can be turned off by means of a below described switching device formed by the flip cover 9. The mirror 7 is disposed in a housing frame 10 (FIGS. 2 and 4) which is in turn connected to a visor body rigidifying metal wire insert 12 of the sun visor body 1. Such connection is through a sheet metal holder 11 connected on the frame 10 and connected to the wire insert 12.

FIG. 3 details the mirror and lighting assembly and the counterbearing area of the sun visor. The counterbearing shaft 5 is removably seated in a plastic bearing piece 13 to which the metal wire support insert 12 is clipped. This rigidly holds the bearing piece 13 in place. Above its upper side, the plastic bearing piece 13 has bearing elements that each have a hole passing therethrough, and these holes are in mutual alignment each for receiving a respective inserted round metallic socket sleeve 14. A respective electric lead 15 is connected to the outside end of each round socket sleeve 14. Each electric lead 15 has at its free end a crimped on cable shoe 16. The shoes 16 are connected, in turn, to the contacts 17 of the lamp 8. The electric leads 15, the cable shoes 16 and the contacts 17 are firmly embedded in the foamed visor body material.

The mirror frame or housing frame 10 is also firmly supported in the sun visor body 1 by the foamed plastic material of the visor body engaging frame 10. Pivotally mounted in the housing frame 10 is a pivotable flip cover 9. The cover fixedly supports a transparent, bulb covering lamp glass 18. The end portions of the lamp glass support electric contacts 19 between which the bulb lamp 8 is mounted. The contacts 19 include outwardly facing contact tabs 20, which are raised into position to contact the contact tabs 21 of the contacts 17 when the flip cover 9 is in its opened up position. Thus, the flip cover 9 serves as a switching arm for turning the light on and off by moving the contact tabs 20 into and out of engagement with the contact tabs 21. After the insertion of the flip cover 9 in the respective seats 22 of the housing frame 10, a counterframe 24 welded to a cover foil 23 is clipped to the housing frame 10. For this purpose, the counter frame 24 has projections 25 on its surface and the housing frame 10 has dimples 26 placed and shaped to receive the projections 25.

For electrically connecting the leads 15 with the electrical system of the vehicle, the counterbearing housing 6 is equipped with two spaced apart contact elements 27, that are oriented parallel to each other and that face in the same direction. The lower area of each contact element 27 is a contact spring 28, and the upper area of each contact element 27 is a plug contact 29. The contact elements 27 are inserted from above into the open top of the counter bearing housing 6. They are locked into the counterbearing housing 6 via snap-in tongues 30 on the longitudinal side of each plug contact that engage in correspondingly placed grooves 31 in the housing 6. Cable shoes 32 are crimped to the wires 33 of the electric system of the vehicle and they are hidden between the vehicle body and the inner body trim. The contact plugs 29 are plugged into the shoes 32. After the cable shoes 32 have been plugged onto the contact plugs 29, the counterbearing housing 6 is mounted to the vehicle body, whereupon all electrical connecting elements are hidden from the view of the observer.

The electrical connection of the contact elements 27 to the leads 15 is accomplished via the counterbearing shaft 5. This shaft is comprised of a central, nonconductive, plastic part 34 that includes molded-on support pins 35 at both ends and conductive metal sleeves 36 covering both pins 35. A compressible helical spring 37 is disposed between the plastic part 34 and one metal sleeve 36. Upon telescoping of the counterbearing shaft 5, it is easy to assemble the shaft into the sleeve sockets 14 for establishing reliable contact with the round metallic sockets 14 and through these with the light source 8.

The sleeves 36 are snap receivable in the respective contact springs 28 when the visor body is at the normal orientation over the vehicle windshield. If the visor body is pivoted away from the windshield, the sleeves 36 snap out of the contacts 28 and the light source is electrically disconnected.

In the second embodiment of FIGS. 7 and 8, elements corresponding to those for the first embodiment are correspondingly numbered with reference numerals raised by 100. Elements not described further have the same characteristics as in the first embodiment. In this embodiment, there is but one contact element 127, in the counterbearing housing 106 and the telescopable counterbearing shaft 134 carries only one contact element 136 which is engageable with the contact spring 128 in the counterbearing housing 106. The counterbearing shaft contact 136 is electrically connected through the round metallic socket sleeve 114 and the electrical contact therein and through the electric lead 115 therefrom with one of the two contacts 119 for the light source 108. The other light source contact 119a is electrically connected to the main bearing shaft 104 of the visor body, through which the light source 108 is then grounded. The main bearing shaft 104 in this situation is formed of metal. In a preferred form, that shaft may be comprised of a metal core 104 around which a layer 150 of plastic material has been injection molded. The electrical connection between the light source contact 119a and the main bearing shaft 104 is through the electric lead 151 from the contact 119a to the metallic wire reinforcing insert 112 that runs through the visor body. The insert 112 eventually extends to and is in continuous electrical contact with the bearing shaft 104. Other features not expressly described herein are substantially the same as in the first embodiment.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:

1. Illuminating means for a sun visor having a visor body and a main swivel bearing on said visor body for swivelingly supporting said visor body and also having a counterbearing shaft supported on said visor body away from said main swivel bearing and a counterbearing housing attachable to a relatively stationary support that is separate from said visor body; said counterbearing shaft being detachably connected to said counterbearing housing upon motion of said visor body around said main swivel bearing toward said counterbearing housing, said illuminating means comprising:

a first contact element carried in said counterbearing housing; said first contact element being connectable to an electric source; a second contact element carried by said counterbearing shaft; said second contact element being engageable with said first contact element on movement of said visor to bring said counterbearing shaft into said counterbearing housing;

a light source carried on said visor body and being electrically connected with said second contact element; said light source being further connected to electric ground.

2. The sun visor of claim 1, further comprising a mirror supported on said visor body; said light source being located at said mirror for illuminating the area around said mirror.

3. The sun visor of claim 1, wherein said main swivel bearing comprises a housing on said visor body and a shaft extending into said housing and attachable to a support separate from said visor body.

4. The sun visor of claim 1, further comprising a metallic insert in said visor body and the said connection of said light source to ground being a connection of said light source to said metallic insert and said insert being connected to electric ground.

5. The sun visor of claim 4, wherein said main swivel bearing comprises a main bearing housing on said visor body and a main bearing shaft extending into said housing and attachable to a support separate from said visor body; said main bearing shaft being comprised of metal and said metallic insert being electrically connected to said main bearing shaft; said main bearing shaft being connected to electric ground.

6. The sun visor of claim 5, wherein said main bearing shaft is comprised of a metal core around which a layer of plastic has been injection molded.

7. The sun visor of claim 5, further comprising a mirror supported on said visor body; said light source being located at said mirror for illuminating the area around said mirror.

8. The sun visor of claim 1, wherein said counterbearing housing is shaped to define an opening therein for receiving said first contact element; said first contact element being located in said counterbearing housing opening; said first contact element including a contact spring for mechanically gripping said counterbearing shaft second contact element; said first contact element further including a contact plug for connecting said first contact element to an electric source.

9. The sun visor of claim 8, wherein said counterbearing housing opening has a detent groove therein for receiving said first contact element; said contact plug of said first contact element having longitudinal edges which grippingly engage said detent groove in said counterbearing housing.

10. The sun visor of claim 1, wherein said counterbearing housing includes two said first contact elements, which are electrically separated and each of which is connectable to a respective electric source;

said counterbearing shaft including two said second contact elements which are also electrically separated and each of which is positioned and adapted to be engageable with a respective one of said first contact elements;

said light source having two poles each electrically connected with a respective said second contact element; one said first contact element being connected to electrical ground.

11. The sun visor of claim 10, wherein said counterbearing housing is shaped to define two separated openings therein each for receiving a respective said first contact element; each said first contact element being located in the respective said counterbearing housing opening; each said first contact element including a contact spring for mechanically gripping said counterbearing shaft of the respective said second contact element; each said first contact element further including a respective contact plug for connecting said first contact element to a respective electric source.

12. The sun visor of claim 11, further comprising a mirror supported on said visor body; said light source being located at said mirror for illuminating the area around said mirror.

13. The sun visor of claim 11, wherein said main swivel bearing comprises a housing on said visor body and a shaft extending into said housing and attachable to a support separate from said visor body.

14. The sun visor of claim 11, wherein each said counterbearing housing opening has a detent groove therein for receiving the respective said first contact element; each said contact plug of said first contact elements having respective longitudinal edges which grippingly engage the respective said detent groove in said counterbearing housing.

15. The sun visor of claim 10, wherein said counterbearing shaft supports said second contact elements thereon spaced apart from each other; said counterbearing shaft being of telescoping design, such that said second contact elements may be moved together and apart; biasing means normally urging said second contact elements apart; socket means on said visor body into which said second contact elements are removably plugged, and said socket means being electrically connected to provide electrical connection of said second contact elements.

16. The sun visor of claim 15, wherein said socket means comprise facing, opposed, spaced apart sockets into each of which one said second contact element is pluggably fitted upon telescoping of said counterbearing shaft and subsequent release thereof; each said socket providing electrified connection to its respective said second contact element.

17. The sun visor of claim 16, further comprising a mirror supported on said visor body; said light source being located at said mirror for illuminating the area around said mirror.

18. The sun visor of claim 16, wherein said counterbearing shaft comprises a central plastic part, with support pins at opposite ends thereof; said second contact elements each comprise a respective metal sleeve on each said support pin; said biasing means comprising a spring between said plastic part and one said metal sleeve.

* * * * *